United States Patent Office 3,364,178
Patented Jan. 16, 1968

3,364,178
THERMOPLASTIC POLY(HYDROXYALKYL
DIPHENYL SULFONE) ETHERS
Robert W. F. Kreps, Arie Klootwijk, and Johan M. Goppel, Amsterdam, Netherlands, assignors to Shell Oil Company, New York, N.Y., a corporation of Delaware
No Drawing. Continuation of application Ser. No. 41,496, July 8, 1960. This application Dec. 21, 1964, Ser. No. 420,169
14 Claims. (Cl. 260—49)

This application is a continuation of co-pending Ser. No. 41,496, filed July 8, 1960, now abandoned.

This invention relates to a process for the production of thermoplastic products suitable for the manufacture of threads, fibers and the like as well as of molded or extruded shapes characterized by relatively high strength at elevated temperatures and high resistance to mechanical shock.

The products produced according to this invention have a high molecular weight and almost exclusively a linear structure in which the group —$C_6H_4$—$SO_2$—$C_6H_4$— occurs several times in each molecule. The products are obtained by reacting dihydroxy compounds with diepoxy compounds, the dihydroxy compounds or the diepoxy compounds or both containing the —$C_6H_4$—$SO_2$—$C_6H_4$— group.

It has been proposed in the past to produce fiber-forming thermoplastic resins by the condensation of epichlorohydrin and phenolic dihydroxy compounds in a process which can be operated in one or two steps. In that process there are employed substantially equimolecular proportions of epichlorohydrin and certain aromatic dihydroxy compounds and a molar quantity of alkali at least equal to that of the aromatic dihydroxy compound. Diphenylolsulfone has been suggested as such a dihydroxy compound. In the process of the prior art, the reactants are heated, generally in the presence of a diluent such as alcohol and a large amount of water, in such a manner that the resin precipitates during the heating step. Although the resins produced in this manner are said to be suitable for fibers, it is found that they are less attractive products than those obtained according to the present invention. It has been concluded that the less satisfactory result is caused by the premature interruption of the reaction by crystallization of the product or by the fact that the solvent present acts as a chain stopper. It has been found that products having higher molecular weights and considerably improved properties, including a relatively high impact resistance of the molded resin, are obtained when the premature interruption of the reaction is prevented.

It is an object of this invention to provide a process for the production of linear polyether resins suitable for the production of fibers and also characterized by high impact resistance in the molded form. It is a specific object to provide a process for the preparation of a condensation product of dihydric bisphenols and diglycidyl ethers of dihydric bisphenols where at least one component contains an $SO_2$ group as the group linking the aromatic rings. These and other objects of the invention will be better understood from the following detailed description thereof.

The objects of this invention are accomplished by a process for the production of thermoplastic products which comprises dissolving in a solvent which is capable of maintaining reactants and reaction product in solution and which is non-reactive with the reactants a dihydric phenolic compound and a diepoxide in substantially equimolar quantity and a catalytic amount of an alkaline compound; at least one of said reactant compounds contains an $SO_2$ group directly bound to two aromatic nuclei of the compound. A distinguishing feature is that the reaction is carried out in a solvent in which the dihydric phenolic compound, the diepoxy compound and the product are soluble and which is substantially non-reactive with the two reactants.

Solvents suitable for use in the process of this invention generally have a dielectric constant of at least 5 at the reaction temperature. Solvents having a dielectric constant of at least 10 at the reaction temperature usually give the best results.

Examples of suitable solvents are ketones, such as methyl isobutyl ketone and cyclohexanone; in particular aromatic ketones such as acetophenone and benzophenone; aldehydes such as furfural; nitriles such as acetonitrile, phenyl acetonitrile, propane dinitrile and benzonitrile; nitro compounds such as nitrobenzene, 1-chloro-2-nitrobenzene and 1-chloro-3-nitrobenzene; organic sulfoxides such as dimethyl sulfoxide; and sulfones such as cyclotetramethylene sulfone (sulfolane), 3-methyl cyclotetramethylene sulfone and 3,4-dimethyl cyclotetramethylene sulfone. Especially important sulfoxy compounds and nitriles are mainly those in which a divalent sulfoxy group (SO or $SO_2$) or the ciane group are directly bound to at least one carbon atom which in turn is directly attached to one or more hydrogen atoms. If desired the solvent used may be a mixture of various components, for example a mixture of di-n-propyl sulfoxide and diphenyl sulfoxide. Solvents which catalyze side-reactions, for example of the epoxy groups, are undesirable.

The favorable effect of the solvent used according to the invention is based on the fact that the product remains in solution until its molecular weight has increased to relatively high values. A suitable choice of solvent and the quantity thereof, and also of the temperature, enables one to prevent the separation of solid macromolecular product, either in a crystalline or in an amorphous state, until the product has reached an intrinsic viscosity of, for example, at least 0.35 or 0.4, preferably of at least 0.8 dl./g., at reasonable concentrations of the product in the reaction mixture, for example at least 5 or preferably at least 10% by weight. In this way even much higher intrinsic viscosities may be attained, for example 1.4 dl./g. This will be illustrated in greater detail in the examples given below. The given values of the intrinsic viscosity are determined in dimethyl formamide.

The increase of the molecular weight of the present products is accompanied by improved mechanical properties. Thus, high values of yield stress and impact strength are obtained. The products also have the advantage of a high softening point and a high heat distortion temperature. They show a high chemical resistance when contacted with acids and bases.

The products produced according to this invention may be thought of as related to products produced from bisphenols in which the two aromatic rings are connected by a carbon atom instead of by an $SO_2$ group. The products according to this invention, however, show a number of superior characteristics, one of the more outstanding of which is their substantially higher softening point and heat distortion temperature compared to compounds prepared from phenols in which in place of the $SO_2$ group there is a carbon atom or an alkyl group.

The following typical values illustrate this difference.

TABLE 1

| Monomers | Polymer No. | | | | |
|---|---|---|---|---|---|
| | 1 | 2 | 3 | 4 | 5 |
| Epoxide: | | | | | |
| Diglycidyl ether of 4,4'-diphenylolpropane | X | X | | X | |
| Diglycidyl ether of 4,4'-diphenylolsulfone | | | X | | |
| Diglycidyl ether of 3,3',5,5'-tetramethyl-4,4'-diphenylolsulfone | | | | | X |
| Phenol: | | | | | |
| 4,4'-diphenylolpropane | X | | | | |
| 4,4'-diphenylolsulfone | | X | X | | |
| 3,3',5,5'-tetramethyl-4,4'-diphenylolsulfone | | | | X | X |
| Properties: | | | | | |
| IV, dl./g. | 0.57 | 0.67 | 0.70 | 0.55 | 0.47 |
| Yield Stress, kg./cm.² | 600 | 750 | 820 | 690 | 880 |
| Tensile impact strength, kg.-cm./cm.² | 265 | 500 | 770 | 360 | 160 |
| Vicat softening temp., 1 mm. pen., °C. | 103 | 135 | 175 | 147 | 167 |

In Table 1, Polymer No. 1 is the polymer of bisphenol A and the diglycidyl ether of bisphenol A. In Polymer No. 2 the sulfone is used as the dihydric reactant. In Polymer No. 3 both the diepoxide and dihydric reactant are sulfones. It is seen that yield stress and tensile impact strength are substantially increased as first one and then two sulfones are used; the increase in softening temperature is especially outstanding. The softening temperature is the Vicat softening point determined according to ASTM test D 1525–58T. Polymers Nos. 4 and 5 contain a sulfone as the dihydric component in both instances. The increase in softening temperature is again pronounced.

The process of this invention comprises the use of any one of three different combinations of feed monomers, as follows:

(1) Dihydric phenolic sulfone plus diepoxide containing the diarylsulfone

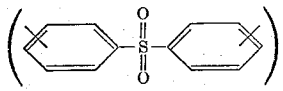

group.

(2) Dihydric phenol plus diepoxide containing the diarylsulfone group.

(3) Dihydric phenolic sulfone plus diepoxide.

In summary, either the dihydroxy compound or the diepoxy compound must be a compound containing a diaryl sulfone group, i.e., a group in which two benzene rings are connected by an SO₂ group. This is represented by the graphic formula:

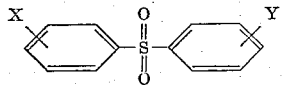

In this formula X and Y represent hydroxyl groups in the case of the dihydric compound and vic-epoxy containing groups such as epoxypropoxy in the case of the diepoxide. The benzene rings may contain other substituents not indicated in the graphic formula, e.g., one or more alkyl groups or one or more halogens.

The formulas of the suitable sulfones differ from those of suitable dicyclic phenols and diepoxides only by virtue of the sulfone grouping (=SO₂) being present between two aromatic rings in place of an alkylene group

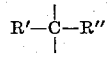

(where R' and R" are hydrogen or alkyl radicals). For simplicity of description, therefore, the following explanation of suitable feed monomers discusses in detail only the phenols and diepoxides. It will be understood that the corresponding sulfones are useful feeds for this process whenever the structure contains the

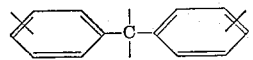

arrangement.

The dihydric phenol may be any of the dihydric phenols which are ordinarily considered suitable for the preparation of epoxy resins. A particularly useful and preferred dihydric compound is 2,2-bis(4-hydroxyphenyl)propane, which is generally referred to as p,p'-bisphenol A. This compound is suitably prepared by the condensation of phenol and acetone, using known reaction methods. Another related compound which produces particularly useful results is the dihydric phenol which results from the reaction of phenol and acetophenone, namely, bis(4-hydroxyphenyl)methylphenylmethane. Other suitable dihydric phenols are bisphenols having two phenyl groups on the same carbon atom, prepared by the condensation of phenol or a substituted phenol with other ketones or aldehydes. Preferred phenols may be represented by the general formula

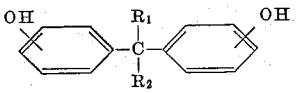

in which R₁ and R₂ when taken collectively with the connector carbon C are from the group consisting of cyclohexyl and alkyl-substituted cyclohexyl, and when taken separately are from the group consisting of hydrogen, alkyl, cyclohexyl, phenyl and alkyl-substituted cyclohexyl and phenyl groups and their halogen derivatives with the total number of carbon atoms in the group or groups attached to said connector carbon atom not exceeding eighteen and the number of carbon atoms in any of said alkyl substituent groups not exceeding six. R₁ and R₂ suitably are alkyl groups, such as methyl, ethyl, isobutyl, n-nonyl, n-heptadecyl and the like.

Examples of other dihydric phenols that are suitable also include bis(4-hydroxyphenyl)methane, 3,3'- and 4,4'-dihydroxydiphenyl, hydroquinone, resorcinol, dihydroxy diphenoxy ethanes and dihydroxynaphthalenes.

The dihydric phenol employed in the process of this invention may be substantially 100 percent pure or may be a technical grade of somewhat lower purity. Concentrates of dihydric phenols containing, for example, 90 to 100 percent of the pure compound may be used in this invention.

The diepoxy compounds used in the process of this invention preferably are the glycidyl ethers of the above referred to dihydroxy compounds.

Dihydric phenols and diglycidyl ethers suitable for use in this invention are described in greater detail in the specification of U.S. 2,506,486 to Bender et al. It has been found, however, that it is preferred for the hydroxy groups or epoxy-containing groups to be in a position on the benzene ring other than the ortho position. The most preferred compounds are the p,p'-compounds, i.e. those in which the substituents are in the 4,4'-position.

Diphenylolsulfones are commercially available products whose methods of preparation are known. An improved method of preparation is described, for example, in German Patent No. 728,276 to Ueberbacher. This patent also discusses the prior known methods of producing these compounds. Use of different phenols results in the production of various dimethylol sulfone homologues.

The commercial diphenylol sulfone generally contains so many contaminants that it has to be purified before use. The contaminants are partly soluble in water, partly in aromatic solvents such as benzene and toluene in which the solubility of the diphenylol sulfone itself is low.

Suitable purification methods are therefore extractions with water and aromatic solvents, preferably carried out at elevated temperatures.

The diphenylol sulfone may be crystallized by dissolving it in ketones such as acetone or methyl isobutyl ketone, and adding aromatics such as benzene to the solution. This method is especially advisable when the water-soluble contaminations are absent or else after they have been removed.

A novel purification method is the recrystallization of diphenylol sulfone from water at temperatures above 100° C. The solubility curve which is very low and flat below 100° C. shows a very pronounced rise above this temperature, particularly between 100° and 120° C. In order to remove the aromatic-soluble contaminants simultaneously, this recrystallization is carried out in water to which a small quantity of an aromatic has been added.

Recrystallization also reduces the quantity of o,p'-diphenyl sulfone present in the p,p'-diphenyl sulfone and consequently results in a better quantity of the macro-molecular final product. The preferred starting material both for the reaction between diphenyl sulfone and its diglycidyl ether and for the preparation of the latter is a diphenylol sulfone having a melting point of at least 240° C.

The diglycidyl ethers of the diphenylolsulfones are prepared similarly to the preparation of diglycidyl ethers of bisphenols. A suitable method, for example, consists of reacting the diphenylol sulfone or diphenylolsulfone homologue with an excess of epichlorohydrin, e.g. a 10-fold molar excess of an alkaline medium at reflux conditions, water being removed azeotropically. Salt is filtered off from the hot solution. The ether crystallizes upon cooling to room temperature.

The diglycidyl ether of the diphenylol sulfone has generally a sufficient degree of purity if the melting point is 162° C. It is also advisable to ensure that this ether contains little or no chloride, for example not more than 0.5% by weight. If necessary, the purity of the diglycidyl ether of diphenylol sulfone is increased by recrystallization, for example from ketones such as methyl isobutyl ketone.

The temperature at which according to the invention a dihydroxy compound is reacted with a diepoxy compound is generally between 80° C. and 200° C., although it may be lower or higher in special cases. If necessary, the solvent is kept in a liquid state at the reaction temperature by applying pressure.

It is advisable to carry out the reaction in the absence of oxygen.

The reaction according to the invention is preferably carried out in the substantial absence of water. The water content is preferably below two percent and still more preferably less than one percent, based on the reaction mixture. Also, use of pure base materials provides important advantages.

The preference for an anhydrous or substantially anhydrous medium means that the catalyst is preferably supplied in an anhydrous condition and that the catalyst added is a substance which does not cause water to be formed in the reaction mixture. Although alkali metal hydroxides may be employed they have the drawback of forming water when reacted with phenols. Hence, the addition of separately prepared salts of strong bases and dihydric phenols to the reaction mixture is preferred. Examples of these strong bases are those of the alkali and alkaline earth metals and of quaternary substituted ammonia. These salts are preferably prepared from the dihydric phenol participating in the reaction. Monosalts of the dihydric phenols have given very satisfactory results.

A suitable manner of preparing such salts in an anhydrous state is one in which dihydric phenol is reacted with an alkali metal alcoholate and in which the liberated alcohol is distilled off.

The permissible limits of the water content depend on the requirements to which the product has to conform and also on the nature of the medium. It is advisable for the water content to be kept below 2% by weight, preferably below 1% by weight, and still more preferably below 0.3% by weight, based on the initial dihydric phenol.

The salts of strong bases and dihydric phenols are generally employed in quantities in the range of from 0.01 to 10 mol percent, particularly from 0.02 to 5 mol percent based on the dihydric phenol initially present, but even lower concentrations may be effective.

Other acids than phenols such as, for example, the stearates of magnesium, aluminum and trivalent iron which are sufficiently soluble in the reaction mixture, may also be used in the preparation of alkali salts which are active as catalysts.

In the process according to this invention the dihydric compound and the diepoxide are reacted in substantially equimolar quantities. Substantially equimolar quantities herein refers to quantities in which the molar ratio of dihydroxy compounds to diepoxy compounds is in the range of from 1.04 to 0.98, preferably from 1.02 to 0.99. The quantity of dihydroxy compounds present as salt, for example, alkali metal salt of a dihydric phenol, is included in this ratio as dihydroxy compound.

Various methods of carrying out the addition of the reactants to the reaction mixture may be employed. For example, the diepoxy compound may be added gradually to the solution containing the dihydroxy compound. It has been found however that gradual addition is not necessary for obtaining the desirable results according to this process. There is no objection to mixing in one operation the total quantities of diepoxy compound and dihydroxy compound to be reacted if these quantities are measured with a sufficient degree of accuracy. Alternatively the diepoxy compound may at first be reacted with a small excess of the dihydroxy compound (for example an excess of a few percentages) and the ratio of these compounds may be corrected to the equimolar ratio in a later stage of the reaction.

The products obtained according to the invention are thermoplastic polymeric products of high molecular weights which can be drawn or melt spun by standard methods to form threads generally capable of being cold drawn. When the resinous products are to be formed into threads by melt spinning it is desirable to prevent as far as possible any further polymerization during the heating and spinning operations and this may be effected by adding at any convenient stage of the condensation a small proportion, for example about 1%, of a mono-functional compound which will react either with an aromatic hydroxyl group or with an epoxide ring; examples of such compounds are glycidol and phenol. These compounds are preferably added to the initial reactants. Alternatively further polymerization may be substantially prevented by boiling the product with dilute aqueous hydrochloric acid or a similar reagent which is capable of destroying an epoxide ring.

The following examples illustrate certain aspects of the invention, including a preferred modification thereof, but they are not to be considered in any way as limiting the invention.

*Example 1*

1.00 mol diglycidyl ether of p,p'-diphenylolsulfone (melting point 166.6° C.–176.4° C.) and 0.97 mol p,p'-diphenylolsulfone (melting point 248.5° C.–249.5° C.) were dissolved in 850 grams of acetophenone in a round-bottomed flask provided with thermometer, stirrer, reflux cooler and gas inlet tube. 0.05 mol monosodium salt of p,p'-diphenylolsulfone were then added. The atmosphere in the flask was freed from oxygen by introducing nitrogen, after which the mixture was brought to 100° C. and kept at this temperature for 60 hours with stirring. The mixture was then cooled to room temperature. During the reaction crystalline material began to separate. Some hours after the end of the reaction crystallization of the product was complete. The crystalline material was removed by suction, washed out with methanol and dried at 100° C. in a vacuum desiccator.

The intrinsic viscosity of the product (measured in dimethylformamide), was 0.43, the softening point 155° C. Double refraction and a sharp Röntgen diagram was also found. The double refraction disappeared at heating to about 230° C. (melting point of crystallite).

Various properties were investigated by testing at temperatures in the range of from 230° C.–250° C. small plates pressed from the crystalline powder. The working up to plates did not present any difficulty since the product showed excellent flow after softening. Various properties were determined at normal temperature, but the yield stress also after heating for certain periods at 160° C. in order to obtain some idea about the thermo-stability. The usefulness of the material at elevated pressure was also ascertained by determining the heat distortion temperature by the ASTM standard method. The action of water and aqueous 5% solution of sodium hydroxide and sulfuric acid was investigated by prolonged immersion of the plates in these liquids. It was found that the liquid was absorbed although there was no chemical change. The results which were very satisfactory are assembled in the following table.

Yield stress, kg./cm.$^2$ _____ 770
Elongation at yield stress _____ 15
Tensile impact strength, kg. cm./cm.$^2$ _____ 650
British Standards Izod impact strength, kg. cm./cm.$^2$ 30
Heat distortion temperature ASTM D648 under
  load of 18.9 kg./cm.$^2$ _____° C__ 154
Yield stress after heating:
  To 160° for 0 hours _____kg./cm.$^2$__ 770
  To 160° for 24 hours _____kg./cm.$^2$__ 1000
  To 160° for 72 hours _____kg./cm.$^2$__ 1000
  To 160° for 100 hours _____kg./cm.$^2$__ 1000
Weight increase at 20° C. in:
  Distilled water for:
    1 day _____percent by wt__ 3.4
    7 days _____do____ 5.3
    14 days _____do____ 5.6
  5% by weight NaOH for:
    1 day _____do____ 3.2
    7 days _____do____ 4.8
    14 days _____do____ 5.1
  5% by weight H$_2$SO$_4$ for:
    1 day _____do____ 3.3
    7 days _____do____ 5.1
    14 days _____do____ 5.4

*Example 2*

The reaction was carried out as described in Example 1 except that the mixture remained at 100° C. for not more than 20 hours. The intrinsic viscosity of the crystalline product, measured in dimethylformamide, was in this case 0.35.

Small plates were pressed from the crystalline powder at 230° C. It was found that this treatment did not affect the intrinsic viscosity. The yield stress of the material pressed into plates was 750 kg./cm.$^2$, the elongation at the yield stress 15–20%, the tensile impact strength 110 kg. cm./cm.$^2$.

*Example 3*

The reaction was carried out as described in Example 1 except that during the experiment the temperature was increased to 150° C. in order to re-dissolve the crystallizing product. Two samples then taken in the course of the experiment showed an intrinsic viscosity of 0.45 and 0.50 respectively. Further polymerization was prevented in these samples by adding a small amount of p,p'-diphenylolsulfone.

After plates were pressed from the two samples (at 230° C. and 250° C. respectively) the following results were obtained.

| Sample No | 1 | 2 |
|---|---|---|
| Intrinsic viscosity | 0.46 | 0.50 |
| Yield stress, kg./sq. cm | 770 | 775 |
| Elongation at yield stress, percent | 15–20 | 15–20 |
| Impact strength, kg.-cm./sq. cm | 650 | 620 |

On comparison of these figures with the results obtained in Example 2 the mechanical property was found to be dependent on the molecular weight of the product (the intrinsic viscosity). A good impact strength was only found at intrinsic viscosities exceeding 0.35.

*Example 4*

The reaction was carried out as described in Example 1 except that the reaction temperature was 150° C. and the reaction time 50 minutes. After this period a solution of 2.5 grams of p,p'-diphenylolsulfone in 25 grams of acetophenone was added to stop the reaction. The mixture was subsequently kept at 150° C. for a further 15 minutes and then cooled to 100° C. and diluted with dimethylformamide to a 10% solution of the polymer. Methanol was added to this solution at room temperature with stirring until the polymer had completely precipitated. The precipitate was washed with methanol and then re-dissolved in dimethylformamide this time to a concentration of 2%. Methanol was added to this new solution until light clouding occurred, whereupon the solution was poured out in distilled water with vigorous stirring. The polymer was thereby flocculated in very small particles. These were removed by suction and washed with water. The resulting powder was dried in a vacuum desiccator at 100° C. The intrinsic viscosity of the product, measured in dimethylformamide, was 1.37.

Small plates were pressed from the crystalline powder at 290° C. This treatment reduced the intrinsic viscosity to 1.29. The yield stress of the material pressed into plates was 775 kg./sq. cm., the elongation at the yield stress 15–20%, the tensile impact strength 690 kg. cm./sq. cm.

*Example 5*

1.00 mol of diglycidyl ether of p,p'-diphenylolsulfone and 1.00 mol of p,p'-diphenylolsulfone were mixed with 125 grams of sulfolane (cyclotetramethylenesulfone) in which 0.002 mol of monosodium salt of p,p'-diphenylolsulfone was dissolved. The mixture was melted and kept in a sealed tube with the exclusion of oxygen at 105° C. for 24 hours. The intrinsic viscosity of the resultant polymer was 0.42 (measured in dimethylformamide).

*Example 6*

1.00 mol of diglycidyl ether of p,p'-diphenylolpropane (melting point 42° C.) was reacted with 0.97 mol of p,p'-diphenylolsulfone in the presence of 0.05 mol of monosodium salts of p,p'-diphenylolsulfone in a manner entirely similar to the one of Example 4. The product was also isolated according to Example 4. The intrinsic viscosity was 0.82 measured in dimethylformamide. Tests carried out with the pressed plates yielded a tensile strength of 770 kg./sq. cm., a British Standard Izod impact strength of 33 kg. cm./sq. cm., a tensile impact strength of 300 kg. cm./sq. cm., a heat distortion temperature under a load of 18.9 kg./sq. cm. (ASTM D 648) of 114° C. and a water absorption of 1.8% by weight after immersion for 140 hours at 20° C. The glass transition point determined from the relationship between the modulus of elasticity and the temperature was approximately 130° C.

*Example 7*

In a manner similar to Example 1 polymers were prepared from methyl-substituted dihydric sulfones. The specific compounds employed were 3,3'-dimethyl-4,4'-dihydroxydiphenyl sulfone and 3,3',5,5'-tetramethyl-4,4'-dihydroxydiphenyl sulfone.

The former compound was prepared by reacting orthocresyl and sulfuric acid and the latter from 2,6'-dimethylphenol and sulfuric acid both at reaction conditions similar to those employed for the preparation of diphenylolsulfone.

TABLE 2

| Monomers | Polymer No. | | | | | |
|---|---|---|---|---|---|---|
| | 1 | 2 | 3 | 4 | 5 | 6 |
| Epoxide: | | | | | | |
| Diglycidyl ether of 4,4'-diphenylolpropane | X | X | X | | | |
| Diglycidyl ether of 4,4'-diphenylolsulfone | | | | X | X | X |
| Phenol: | | | | | | |
| 4,4'-diphenylolsulfone | X | | | X | | |
| 3,3'-dimethyl-4,4'-dihydroxydiphenylsulfone | | X | | | X | |
| 3,3',5,5'-tetramethyl-4,4'-dihydroxydiphenylsulfone | | | X | | | X |
| Properties: | | | | | | |
| IV, dl./g. | 0.67 | 0.55 | 0.55 | 0.70 | 0.52 | 0.43 |
| Yield stress, kg./cm.² | 750 | 815 | 690 | 810 | | 810 |
| Yield elongation, percent | 10-15 | 10-15 | 10-15 | 10-15 | | 10-15 |
| Tensile impact strength, kg.-cm./cm.² | 495 | 205 | 365 | 775 | | 325 |
| Vicat softening temp. at a penetration of 1 mm., °C. | 144 | 131 | 147 | 170 | 144 | 145 |
| Water absorption percent w. (3 hr. boiling water) | 6.50 | | 1.64 | 10.40 | 3.87 | 3.42 |

In Table 2 are shown some typical properties of compounds prepared by reacting each of these methyl substituted sulfones both with diglycidyl ether of 4,4'-diphenylolpropane and with diglycidyl ether of 4,4'-diphenylolsulfone. It is seen that, in general, the polymers have a high yield strength and reasonable tensile impact strength. The softening temperatures of the polymers based on the methyl-substituted diphenylol sulfones are of the same order as the softening point of a polymer prepared from the diglycidyl ether of 4,4'-diphenylolpropane with unsubstituted 4,4'-diphenylolsulfone. The water absorption of the methyl substituted diphenylolsulfone based polymers is lower than that of the corresponding polymers prepared from diphenylolsulfone itself.

*Example 8*

The reaction of Example 3 is repeated, except that, in separate experiments, the following reactant pairs are used. In each case, fiber forming thermoplastic polymers having an intrinsic viscosity of at least about 0.4 dl./g. are produced.

The illustrative reactant pairs are: diglycidyl ether of p,p'-diphenylolsulfone and: bis(4-hydroxyphenyl)methylphenylmethane, hydroquinone, resorcinol, or p,p'-dihydroxydiphenyl; p,p'-diphenylolsulfone and the diglycidyl ether of: bis(4-hydroxyphenyl)methylphenylmethane, hydroquinone, resorcinol or p,p'-dihydroxydiphenyl.

The preferred polyethers of this invention are substantially linear products in which the following segment is repeated in the polymer chain

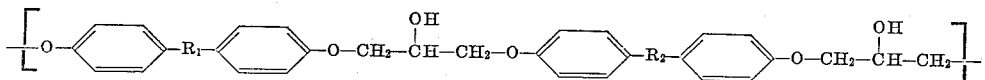

In this formula either $R_1$ or $R_2$ or both $R_1$ and $R_2$ are sulfone groups (—$SO_2$—). One of the two groups may be an alkylene group

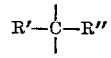

wherein R' and R" are hydrogen or alkyl radicals; preferred among these is the dimethylmethylene group

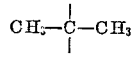

of bisphenol A.

We claim as our invention:

1. A process for the production of thermoplastic products which comprises dissolving substantially equimolor quantities of reactants consisting of a dihydric phenol and a diglycidyl ether of a dihydric phenol at least one of said reactants containing the diarylsulfone group, together with a catalytic amount of an alkaline catalyst, in a non-reactive organic solvent having a dielectric constant of at least 5 at the reaction temperature and capable of keeping said reactants in solution and maintaining the solution at an elevated temperature of at least 100° C. until a thermoplastic reaction product of at least about 0.35 dl./g. intrinsic viscosity, measured in dimethylformamide, has been formed.

2. A process according to claim 1 in which said solvent is a ketone selected from the group consisting of methylisobutyl ketone, cyclohexanone, acetophenone and benzophenone.

3. A process according to claim 1 in which said solvent is a sulfone selected from the group consisting of cyclotetramethylene sulfone, 3-methylcyclotetramethylene sulfone and 3,4-dimethylcyclotetramethylene sulfone.

4. A process for the production of a thermoplastic material capable of being drawn into fibers and characterized by a Vicat softening temperature of about 175° C. determined according to ASTM test D 1525-58T, which comprises dissolving equimolar quantities of p,p'-diphenylolsulfone and the diglycidyl ether of p,p'-diphenylolsulfone in anhydrous acetophenone, together with from 0.02 to 1 mol percent of the monosodium salt of p,p'-diphenylolsulfone and maintaining the solution at about 150° C. until a reaction product is obtained which has an intrinsic viscosity of at least 0.35 dl./g., measured in dimethylformamide.

5. A process according to claim 1 in which both said dihydric phenol and said diglycidyl ether of a dihydric phenol contain said diaryl sulfone group.

6. A process according to claim 1 in which only said diglycidyl ether of a dihydric phenol contains said diaryl sulfone group.

7. A process according to claim 1 in which only said dihydric phenol contains said diaryl sulfone group.

8. A process according to claim 1 in which said solvent is furfural.

9. A process according to claim 1 in which said solvent is a nitrile selected from the group consisting of acetonitrile, phenyl acetonitrile, propane dinitrile and benzonitrile.

10. A process according to claim 1 in which said solvent is a nitro compound selected from the group consisting of nitrobenzene, 1-chloro-2-nitrobenzene and 1-chloro-3-nitrobenzene.

11. A process according to claim 1 in which said solvent is dimethyl sulfoxide.

12. A process according to claim 4 in which said reaction product is recovered by cooling the solution to about room temperature, holding the solution until crystals of product are precipitated, and washing the crystals with methanol.

13. A thermoplastic, substantially linear polyether condensation product of substantially equimolar quantities of p,p'-diphenylolsulfone and the diglycidylether of p,p'-diphenylolsulfone, characterized by an intrinsic viscosity of at least about 0.7 dl./g., measured in dimethylformamide, a Vicat softening temperature of about 175° C. and a tensile impact strength of at least about 770 kg. cm./cm.².

14. A thermoplastic, substantially linear polyether containing at least predominantly recurring units of the formula

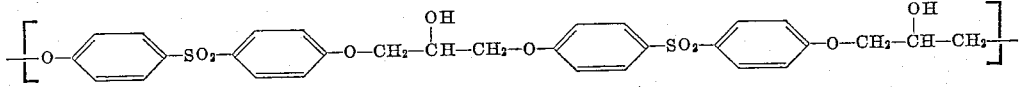
having an intrinsic viscosity of at least about 0.8 dl./g.
References Cited
UNITED STATES PATENTS
| | | |
|---|---|---|
| 2,592,560 | 4/1952 | Greenlee. |
| 2,602,075 | 7/1952 | Carpenter. |
| 2,615,008 | 10/1952 | Greenlee. |
| 2,945,004 | 7/1960 | Greenlee. |
| 3,044,983 | 7/1962 | Singley _____ 260—49 |
| 3,177,089 | 4/1965 | Marshall et al. _____ 117—72 |
| 3,305,528 | 2/1967 | Wyntra et al. _____ 260—47 |
WILLIAM H. SHORT, *Primary Examiner.*
LOUISE P. QUAST, *Examiner.*
M. GOLDSTEIN, J. C. MARTIN, *Assistant Examiners.*